United States Patent

[11] 3,538,824

[72] Inventor Karl Heinz Lange
 Bunde-Ennigloh, Westphalia, Germany
[21] Appl. No. 699,659
[22] Filed Jan. 22, 1968
[45] Patented Nov. 10, 1970
[73] Assignee Balda Werke Photographische Gerate und
 Kunststoff, R. Gruter
 Kommanditgesellschaft
 Westphalia, Germany
 a German company
[32] Priority Jan. 24, 1967
[33] Germany
[31] B 90,855

[54] PHOTOGRAPHIC CAMERA WITH MUTUAL
 TRANSPORT AND EXPOSURELOCK
 14 Claims, 10 Drawing Figs.
[52] U.S. Cl. .................................................. 95/11,
 240/1.3, 240/37.1
[51] Int. Cl. .............................................. G03b 19/04
[50] Field of Search........................................95/11, 11.5,
 31; 240/1.3, 37, 37.1

[56] References Cited
UNITED STATES PATENTS

| 3,232,196 | 2/1966 | Sapp et al. | 95/55X |
| 3,353,467 | 11/1967 | Ernisse et al. | 240/1.3X |
| 3,354,300 | 11/1967 | Parsons et al. | 240/37.1X |
| 3,369,468 | 2/1968 | Sapp et al. | 95/11.5 |
| 3,416,424 | 12/1968 | Harvey | 95/11X |

Primary Examiner—Norton Ansher
Assistant Examiner—Robert P. Greiner
Attorney—Sparrow and Sparrow ABSTRACT: A film camera has the conventional winding and unwinding film spools and has a combined mutual locking mechanism for the film transport and the exposure mechanism. The film transport mechanism automatically advances a flashbulb receptacle. The film transport locking mechanism is unlocked when a new film is loaded and when a film is present in the camera. The locking device is locked after each full advancement of the flashbulb receptacle and in the case of the absence of a film or when a perforation of the film is in the correct place after the film has been advanced after an exposure has been made. The film transport mechanism is locked when the film exposure mechanism is actuated.

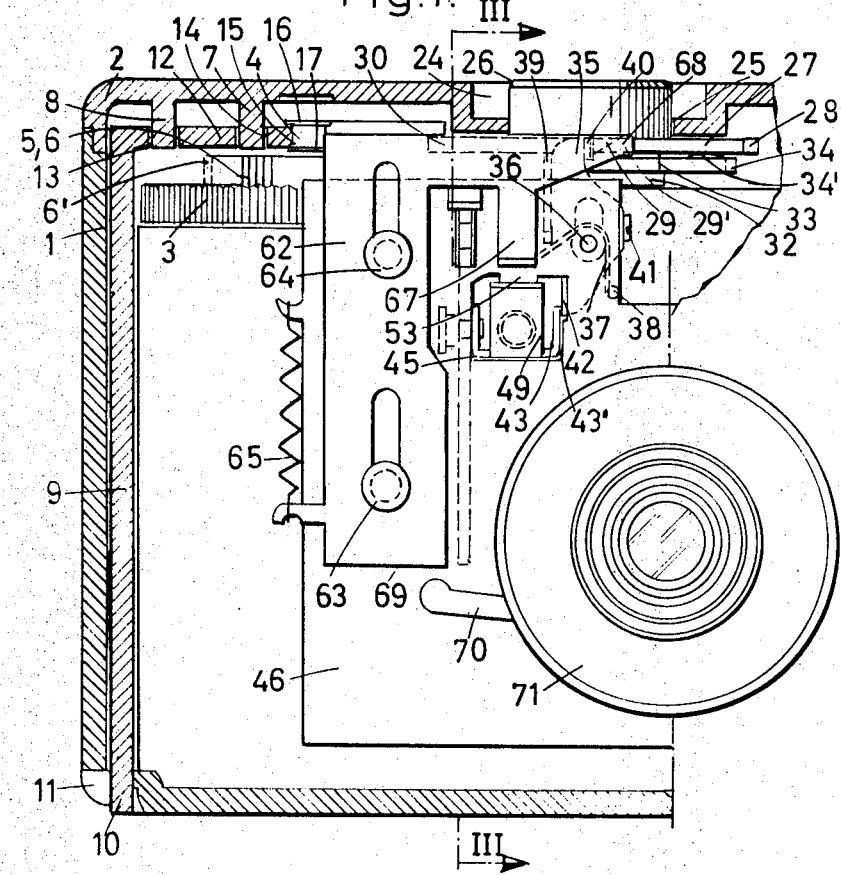

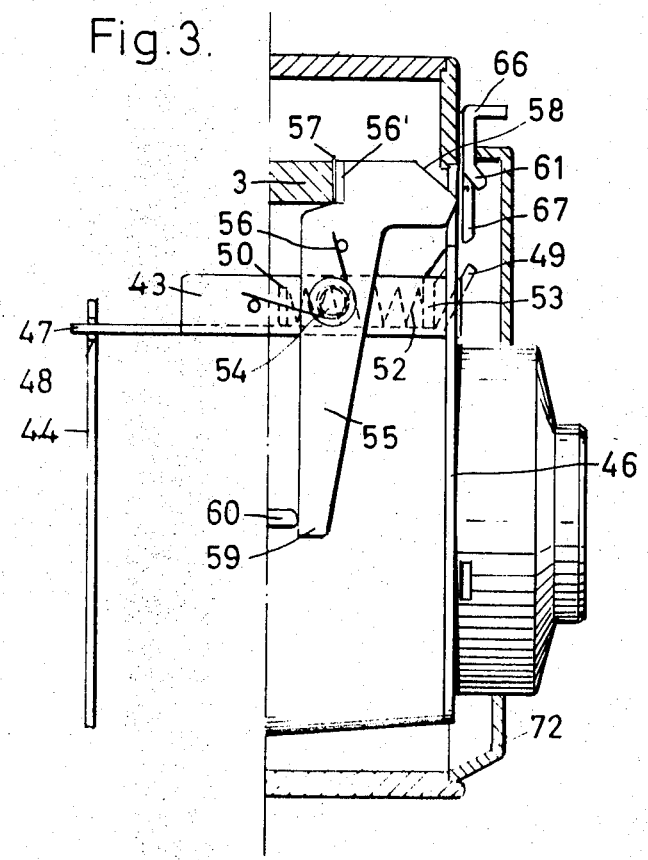
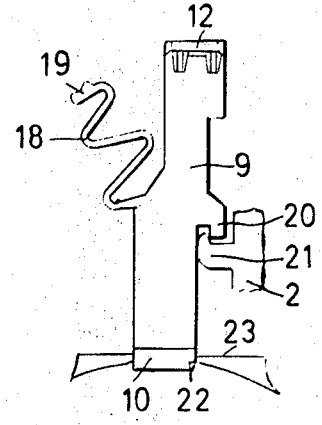
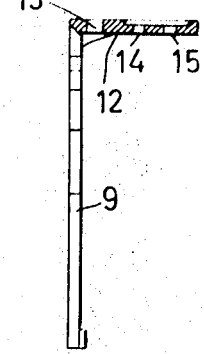
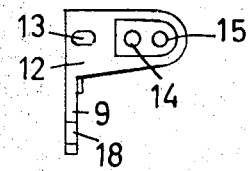
INVENTOR:
Karl Heinz Lange
By
Sparrow and Sparrow
Attorneys

PHOTOGRAPHIC CAMERA WITH MUTUAL TRANSPORT AND EXPOSURELOCK

BACKGROUND OF THE INVENTION

The invention refers to a photographic camera with mutual transport and exposure lock and with a flashcube attachment which automatically advances. Such cameras are actually already well known. Through the mutual lock they reliably avoid all double exposures and also undesired blank exposures. The automatically advancing flashcube facilitates four flash exposures in rapid sequence without replacement of the flashbulb.

SUMMARY OF THE INVENTION

The invention concerns the advantageous improvement of the above-mentioned camera in such a way that, after each exposure until the completion of the advancement of the flashcube, the lock of the film transport is released when the camera is loaded but takes place when no film is present. By this fact that the advancement mechanism of the flashcube is incorporated into the lock mechanism the problem is solved with minimal expenditure. Even despite the low cost this lock has the advantage of allowing the camera's action to be demonstrated not only when loaded but also when empty. This is advantageous in explaining the camera to a customer.

BRIEF DESCRIPTION OF THE DRAWINGS

The invention will now be explained in closer detail with the help of two examples of construction, as given in the drawings, FIGS. 1—6 for the first, FIGS. 7—10 for the second example.

The FIGS. show:

FIG. 1 a front elevation of the first model of the camera;

FIG. 2 a top view with the housing cover removed;

FIG. 3 a cut along the line III–III of FIG. 1 neglecting insignificant details;

FIGS. 4—6 different views of the locking slide plate;

DESCRIPTION OF THE PREFERRED EMBODIMENT

Figure 7:
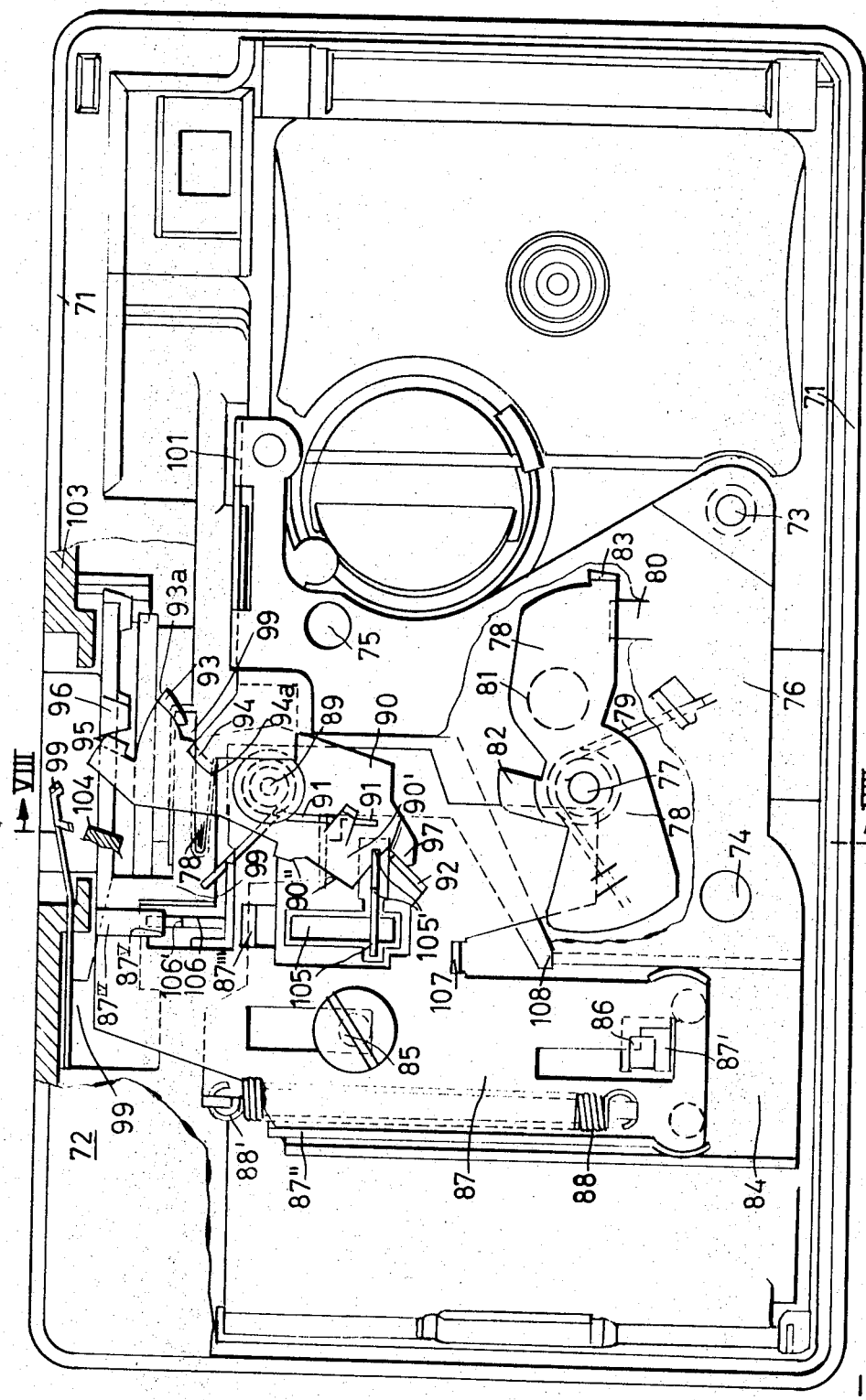
FIG. 7 a rear view of the second model of the camera with opened back cover shortly before the completion of the film transport movement, with the trigger remaining locked.
Figure 8:
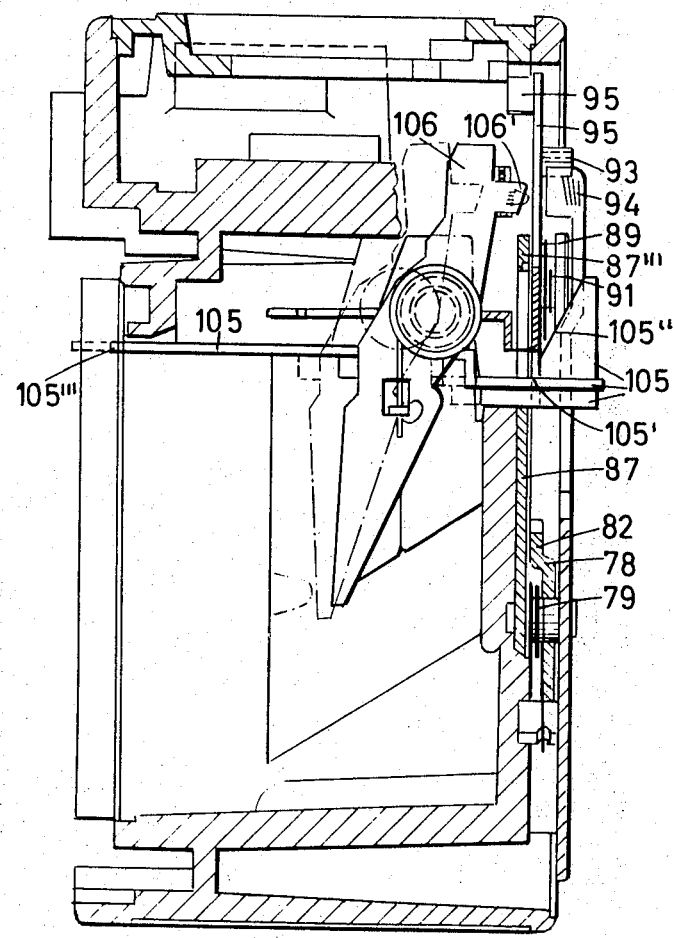
FIG. 8 a cut along the line VIII–VIII in FIG. 7.
Figure 9:
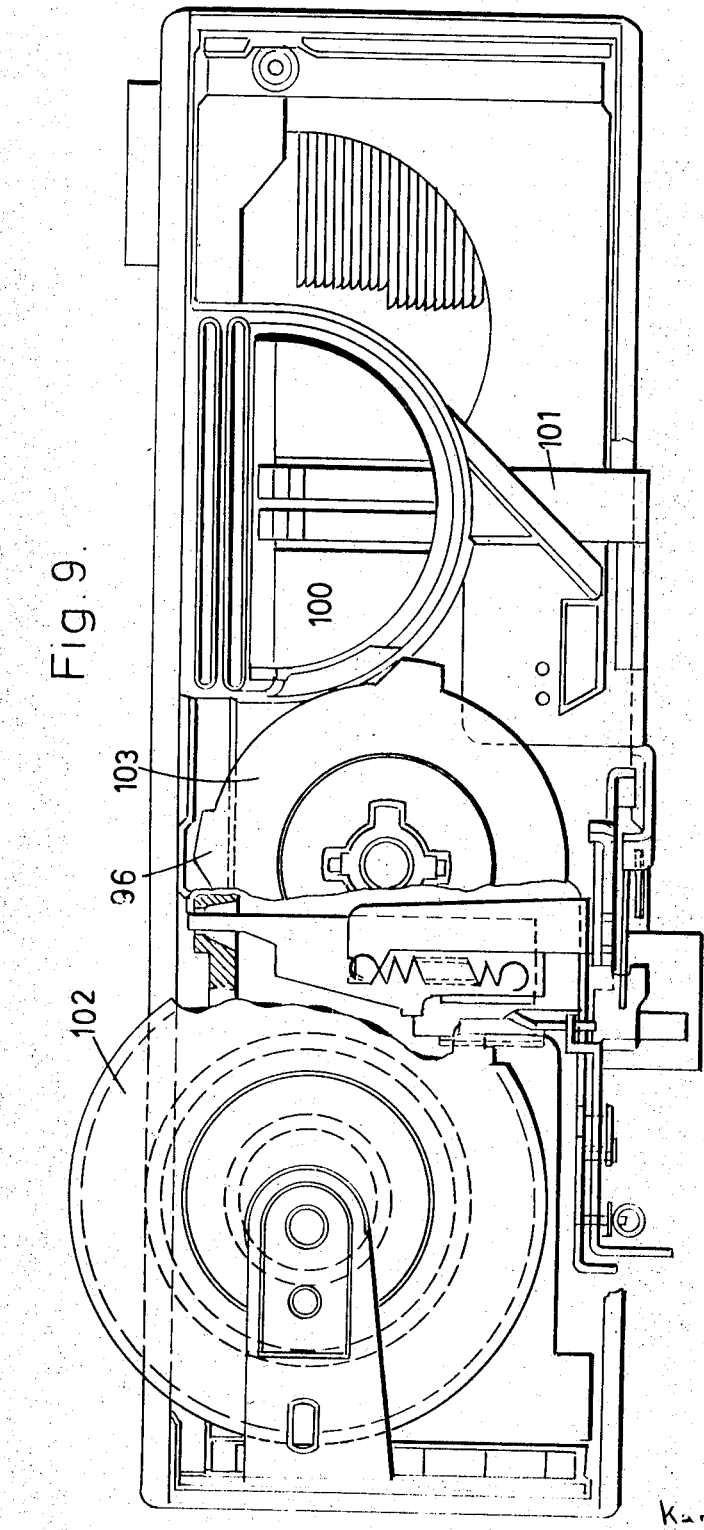
FIG. 9 a view of the camera as in FIGS. 7 and 8 with cover partially cut away.

In the FIGS., the housing unit 1 is shown with a cover 2, a film-winding wheel 3 being positioned in a usual way but not illustrated with greater detail. Off center from this wheel but concentric with the winding spool of the film cartridge, also omitting details, is a catch 4 with its prongs reaching into the spool body and also having a gear 5 which is able to slide vertically (FIGS. 1, 2). The gear 5, despite its vertical movement, continuously engages the gear 6 of the film transport spool 4 which protrudes from the side of the camera for handling. A cover locking slide plate 9, 12 is guided by the posts 7 and 8, and when actuated, opens the cover 2 of the camera as shown in FIG. 4.

It protrudes with its lower end 10 out of the pocketlike opening 11 of the housing unit 1. On its bent-off part 12 it has two guide holes 13 and 14, which essentially serve to guide the slide plate 9, 12 along the posts 7, 8 of the cover 2, and has another bore hole 15, which serves as second bearing for the catch 4 in addition to the centered bearing on the winding spool as already mentioned. The catch 4 on its upper cylindrical end is equipped with a flange 16 through which it can (by means of the slide plate 9) be disengaged from the film-winding spool, while the central bearing is maintained.

A pressure spring 17 at the recess of the cover locking slide plate 9 allows the catch 4 to engage the film spool. The locking plate 9 according to the invention is made of synthetic material and is equipped with an integral spring 18 (FIG. 4) which with its end 19 abuts a corner of the housing unit 1 and thereby holds the slide plate 9 down in the locked position and urges it to the right, in FIG. 4.

A hook 20 works together with a corresponding hook 21 belonging to the cover which itself is not more fully shown. The locking slide plate 9, near its end 10, has a recess 22 which at operation of the slide plate 9 is able to coact with an edge 23 of the pocket like recess 11 in the housing unit 1. The cover 2 has a recess 24 (FIG. 1), which is essentially cylindric, for receiving the flashcube foot, and a bore 25 concentric to it for bearing the flashcube receptacle 26. Attached to the latter is a disc 27 with four prongs or abutting noses 28, 29, 30, 31 arranged at right angles on the disc (FIG. 2). On a cylindric projection 32, also rigidly connected to receptacle 26, a ring-shaped flat recess 33 is arranged adjacent to disc 27. This recess 33 serves for bearing and guiding a toothed ring disc 34 driven by the transport wheel. The disc 34 forms a friction coupling at or near its inner circumference by the aid of several resilient tongues 34' together with the receptacle 26 respectively disc 27, in order to transfer force from the disc 34 to the disc 27 and thereby to the flashcube receptacle 26.

A lever 35 which is pivoted and lengthwise slidable on point 36 and rotatably held by a resilient leg spring 37 coacts with the four prongs or tongues 28—31.

The one arm of the leg spring 37 abuts a stud 38 of the housing unit 1, while the other end abuts against a flange 39 of the lever 35 bent toward the back in FIG. 1. Another flange 40 pointing backwards serves as an abutment for the prongs 28—31. Furthermore the lever 35 has a tongue 41, which is bent in the opposite direction of the flanges 39 and 40. Another end 42 of the lever 35 bent towards the front coacts with a sliding U-shaped stop member 43 (FIGS. 1 and 3). This stop member is guided first into the housing unit 1 near the film 44 (FIG. 3) and second into an opening 45 in the mounting plate 46 but is not shown in greater detail.

The end 47 of the stop member 43 adjacent to the film 44 engages the perforation hole 48 of the film 44 (FIG. 3). The stop member 43 furthermore is provided with an oblique tongue 49, with a second tongue 50 and with a stop edge 51 (FIG. 2). A pressure spring 52 (FIG. 3) abutting on one side tongue 50 (FIG. 3) of stop member 43 and on the other side a tongue 53 of mounting plate 46, forces the stop member 43 in the direction of the film 44.

By means of a rivet 54 (FIG. 3) a lock lever 55 pivots on the stop member 43 and is held tightly by the pressure of a spring 56. The edge 56' of the stop lever 55 engages the knurled edges 57 of the transport wheel 3. The edge 58 of the stop lever 55 does not protrude beyond the surface of the mounting plate 46. A lower end 59 of the lock lever 55 abuts against a stud 60 of the housing unit 1.

The edge 58 of the stop lever 55 coacts with an abutting surface 61 of the release slide plate 62. The latter is lengthwise guided by means of rivets 63 and 64 (FIG. 1) and is pulled up by the tension spring 65. The bent-off tongue 66 (FIG. 3) serves as a contacting surface for the photographer's finger during exposure release on one of its arms. The release slide plate 62 has another tongue 67 furthermore which at actuation coacts with tongue 49 and also has an elongated end 68 (FIG. 2).

The release slide plate 62 causes the release of the exposure (FIG. 1) by the face 69 (FIG. 1) through release lever 70 of shutter 71. The shutter 71, as well as the whole locking mechanic, is covered by a cover 72 (FIG. 3). The one end of the bent-off tongue 39 of lever 35 is positioned on the abutment 73 (FIG. 2) of the housing unit 1.

The camera operates in the following manner:

When the cover is released by pressure on the lower end 10 of the locking slide plate 9, the locking slide plate 9 remains in the same position, with the notch 22 resting on the edge 23 as a result of the pressure applied by the spring 18. In this position the catch 4 is moved over collar 16 by the bent-off end 12 of the stop slide plate 9 and out of the area of the film magazine or film spool, respectively. If a film cartridge is now loaded and the cover closed, the hook 21 of the cover 2 will push the locking slide plate 9 and cause the same to be slipped off the edge 23 by the action of the integral spring 18 and then return in the closed position once again. At the same time the catch 4 engages the film transport spool. According to FIGS. 1—3 the film transport originally was locked by engagement between 56' and 57 and the exposure was ready for release. But because the starting end of the newly loaded film has no perforation holes in the area of the end 47 of the release stop slide plate 43, which will always be the case because a paper starting end precedes the actual film with its perforations, the release stop slide plate 43 is pushed to the right according to FIG. 3 until the edge 56' has reached out of the area of the locking gear 57 (FIG. 2) of the transport wheel 3. At the same time, however, the edge 58 of the locking lever 55 arrives in the area of the abutment 61 of the release slide plate 62 which prevents the latter from being pushed through and an exposure from being taken. By the film transport wheel 3, which now has come into working position, and by its gear 6 and the gear 5 of the catch 4 and by the catch itself the film can now be advanced. Also, simultaneously, the toothed disc 34 (FIG. 2) is rotated by the outer gear 6' of the film transport wheel 3. But because the prong 29 of the flashcube receptacle 26, under the pressure of the transport force, still abuts against the tongue 40 of the lever 35 and because this lever with tongue 39 abuts against abutment 73 of the housing unit, the friction between plate 34 and the flashcube receptacle becomes ineffective, and the latter 26 does not turn.

If now the film is advanced until the first perforation hole 48 is reached, then the release stop slide plate 43 engages the same with its end 47 and thereby moves the lock lever 55, which is connected to the slide plate and whose end 59, is supported by the abutment 60 of the housing unit 1. The lock lever 55 now strikes the locking gears 57 of the transport wheel 3 with its stopping edge 56 and thereby locks the film transport. The flashcube remains stationary. If now the release slide plate is pressed down by bent-off tongue 66 for the purpose of making an exposure, then, at first, the abutting surface 61 passes the outer end of edge 58 and thus prevents the stop edge 56' from releasing the film transport, while the release tongue 66 is pressed down.

By further depressing of the release slide plate 9 the tongue 67 reaches the oblique surface 49 of the stop slide plate 43 and begins to draw the latter out of the film perforation, against the pressure of the spring 52. As the stop lever 55 furthermore is abutting against the backside of release slide plate 62, the end 59 lifts from abutment 60 and thus the leg spring 56 is tensioned. At the same time the elongated arm 68 of the release slide plate 62 reaches the tongue 41 of lever 35 and has moved the latter out of the area of abutting tongue 29 against the effect of the leg spring 37 which is attempting to rotate the lever 35 beneath tongue 29 in FIG. 1 in clockwise direction.

But now the end 42 of lever 35 abuts the surface 43' of the U-shaped stop slider 43 and, upon reacting the exposure release position of the release slider 62 and when the stop slider 43 has been drawn forward sufficiently, by actuation of tongue 67 on tongue 49, the end 42 enters behind edge 51 of the stop slider 43 and locks the latter, so that it cannot return into the perforation. Now the returning release slider 62 also allows the lever 35, driven by leg spring 37, at least to move upward but without loosening the lock of stop slider 43 at the edge 51, because lever 35 is subjected to an additional torque by spring 37 in clockwise direction. Therefore the tongue 40 does not return to a position on the tongue 29, but on the contrary reaches its oblique backside 29' (FIG. 1). Shortly before reaching the uppermost end position of the release slider 62 (FIG. 1) the lock lever 55 with its edge 58 (FIG. 3) is rotated until it is beneath the abutment 61 (FIG. 3) and the end 59 has reached the abutment 60 of the housing unit. But in view of the fact that the stop slider, bearing the stop lever 35, is held, as before, with its lower end behind the edge 51, the stop edge 56' does not reach knurled stop 57 and the film transport is free, and by the latter now also the flashcube receptacle 26 can be advanced to the next position (abutment 28).

The spring 37 and the friction 27/34 as well as the other friction conditions are to be adjusted in such a manner that the spring 37 restores the lever 35, but itself is overcome by the friction force between 34 and 27.

At determining the gear ratio between spur gear 6' of film transport wheel 3 and toothed disc 34 one should start with the thought that the disc 34 and therefore also the flashcube receptacle 26 must rotate 90° even if the film transport wheel 3, caused by the increasing film spool diameter, has reached its smallest rotation angle from one picture to the next.

Therefore, if the film is now advanced even at the largest diameter of the filmroll, the subsequent prong or tongue 28 of the flashcube receptacle 26 even before the next perforation hole is reached would reach the abutting tongue 40 of the lever 35 which is still rotated clockwise, and rotates it against the clockwise direction so that the edge 42 releases the stop slider 43 at the edge 51 of the latter so that it protrudes forward until the end 47 reaches the film surface 44.

Although the film cube receptacle 26 in its new position is stopped by the lever 35 because tongue 39 contacts the abutment 73 of the housing unit 1, the film transport wheel is still further rotatable because the friction between 34 and 26 is now overcome and is ineffective and the stop slider 43 contacts the film surface but has not yet entered the next perforation hole.

But if now the next perforation hole is reached, the stop slider 43, driven by spring 52 completes the rest of its way and allows the lock lever 55 with its edge 56' to enter and engage the stop teeth 57 of the transport wheel 3.

The edge 58 of the lock lever 55 in this moment has released the abutting surface 61 again so that the release slider 62 can be depressed for the next exposure.

As to be seen from the foregoing, the film transport wheel, if no film is put into the camera would be able to be rotated only so far, that the cube receptacle 26 has performed exactly a quarter rotation and the lever 35 has released the stop slider 43 again which then momentarily springs into its end position, because the stop slider now is not stopped by the surface of the film or paper end but promptly reaches the film transport stop position. When operated without film spool inserted, the driving friction between toothed disc 34 and flashcube receptacle 26 becomes ineffective and the flashcube is not advanced (but releasing of the shutter by depressing the release tongue for demonstration purposes is still possible).

In the sample of FIGS. 1—6 a certain adjustment of the parts and their movements during exposure release is necessary in order to ensure the cooperation of the various links and sliders, otherwise it may occur that the transport lock is released before the exposure release is effected or vice versa. These disadvantages are avoided at the example of FIGS. 7—10 and an improvement of the operation as well as a simplification of production attained by the fact that the controlling of cocking and locking lever, locking the transport stop in the open exposure release position and then unlocked by the tongues of the flashcube receptacle, also serves for operation of the shutter segment. Thereby the coincidence of the release of the transport stop and of the exposure release is ensured. Preferably the control lever for the transport stop is coupled with the release tongue or rather is pivoted on it or on a slider connected to it.

In FIGS. 7—10, part 71 is a housing unit which is closed in front by a cover 72. At the points 73, 74, 75 of the housing unit a mounting plate 76 is attached by screws.

At 77 the shutter segment having its mass increased beyond necessary strength and for the purpose of weight balance double-winged-shaped, is pivoted and is disposed in starting position by the leg spring 79 and is forced against an abutment 80 on the mounting plate 76. The one wing of the shutter segment 78 covers the opening 81 provided for the passing of the exposure light and thereby forms the shutter of the camera. The shutter segment 78, furthermore, has a noselike projection 82 as well as another nose 83 the latter in combination with a resetting contact or the like not shown, is able to be used for time adjustment of the shutter. A U-shaped part 84 of the mounting plate 76 together with a setscrew 85 of the mounting plate 76 and a tongue 86 bent out of the mounting plate and at assembly being introduceable through an opening 87' of the slide plate 87 form a linear guide for the release slide plate 87, the latter being held in its start position by a tension spring 88 which with one end 88' is fastened at the mounting plate 76. The slider 87 is actuated by a release trigger not shown, which may be attached to the tongue 87'' and protruding forward to the outside. On point 89 of the release slider 87 a cocking or control lever 90 is pivoted and with its nose 97 by spring 91 forced against abutment 92 of release slider 87. A curved end 93 of control lever 90 during exposure release cooperates in sliding engagement with an evenly curved end 94 of the mounting plate 76.

The control lever 90 furthermore is provided with a bent-off end 95 which during transport movement protrudes into the way of the four abutting noses 96 of the film transport and flashcube receptacle advancing gear and is engaged at every end of the transport movement by one of said four noses 96 as has been described for the example of FIGS 1—6.

The control lever 90 in restored position with nose 97 abuts against abutment 92 of mounting plate 76. The tonque 95 together with the accordingly formed end 98 of the one flashcube contact 99 forms the synchroswitch, which during exposure release, even shortly before the shutter opening occurs, transmits the necessary firing voltage to the flashcube so that the flash at reaching the full shutter opening has its largest light intensity. The other flash contact is not shown but simultaneously forms the upper connection with the batteries, positioned in space 100, whose second lower connection is formed by tonque 101, which is an integral part of the mounting plate 76 or in other words forms a resilient part of it. In the position shown in FIG. 7 it is supposed that the user by rotation of the film transport wheel 102 protruding to the outside has already operated to a certain degree the film transport and that meanwhile nose 96 of the flashcube receptacle 103 evenly moved by friction drift has just reached in FIG. 7 from the right hand the tonque 95 of control lever 90. By further rotation of transport wheel 102 the tonque 95 and thereby control lever 90 is driven until tongue 95 reaches the abutment 104 of the housing unit 1 whereby the flash cube receptacle 103 has attained its new normal position. At this instant or shortly afterwards as it overcomes the eventual friction coupling the stop slider 105, which has been described for part 43 in FIGS. 1—6, with a special swiveling lever 106 pivoted on it and engaging the knurled transport wheel 102, has been released by the projection 90' of control lever 90 engaging in a slot 105' of the stop slider 105 and moves perpendicularly to the drawing plane of FIG. 7 backwards (to the left in FIG. 9), so that abutting edge 106' of swiveling lever 106 pivoted on it, is moved also backwards (in FIG. 7) from the area of abutting edge 87$^V$ of slider 87 and thereby (by the lock lever 106 engaging the transport wheel 102) locks the film transport, when the slider with its end 105''' (FIG. 8) is entering the next film perforation hole or if film is absent.

The latter effect is desirable for explanation of the camera and for demonstration purposes. If now the release handle is depressed, then also the control lever 90, in the described position already rotated in a counterclockwise direction in view of FIG. 7, is moved downwards. Thereby at first the abutment of tonque 93 at the oblique edge of nose 96 determines the position of lever 90 until part 93 from above is contacting part 94 and slides on it. The edge 90'' of projection 90' is so shaped that at descending of slider 87 and simultaneous rotation of lever 90 by the engagement of the parts 93, 94, the edge 90'' is running always quite near the stop slider 105 but without contacting it.

But at the end of movement, slider 105 by influence of edge or nose 87''' on the oblique edge 105'' (FIG. 8) is drawn forward to a position where edge 90'' is lying adjacent to its slot 105' and able later on to enter the latter.

During the entire descent a bent-off projection 87$^{IV}$ of slider 87 which already, before stop slider 105 is moved, slides in front of the releasing edge 106' of swiveling lever 106, retains the latter in order to release it at first shortly before the definite resetting of slider 87 and thereby locks the latter. At depressing the release tonque 87 the tonque 95 lifts the catch 96, but thereby lever 90 is not released but driven by the oblique curve 94 acting on the curved nose 93 and at depressing of the release tonque is rotated furthermore in its previous counterclockwise direction.

By this tonque 97, already during transport movement being lifted from tonque 92, at depressing enters behind tonque 82 of shutter segment 78. If then the edge 93a has reached the edge 94a, the control lever slips off and in clockwise rotation returns to its initial position, abutting again with tonque 97 the abutment 92 of the release slider 87.

But during movement for a desired short period of shutter opening and through tongue 82 of shutter segment 78 it has caught and released the latter. Furthermore tongue 95 at its rotation in clockwise direction contacts the flash contact over its entire length from the left to the right. Simultaneously during the downwards directed release movement, the stop slider 105 at its oblique plane 105 has been withdrawn from the transport stop position by tongue 87''' of slider 87. At resetting of lever 90 which enters with its projection 90' into the slot 105, which is now ready for receiving, the stop slider 105 is held in its unlocked transport position so that at exposure releasing and restoring of slider 87 (by spring 88) the transport movement is released. At the end of the movement the auxiliary lever 106 is also withdrawn from the teeth of transport wheel 102 by its rotation at sliding of edge 106' from edge 87$^V$ of slider 87, while simultaneously the exposure release movement is locked as it has been described in the first example according to FIGS. 1—6, by the edge 106' of the swiveling lever 106 in combination with the edge 87$^V$ of slider 87 now forming a lock abutment. At return movement of slider 87 the swiveling lever 90 shows the position as in FIG. 7 that part 93 was moving at the right hand from part 94 upwards into the shown position, therefore performs a full rotation around part 94 during a release and cocking cycle.

Figure 10:
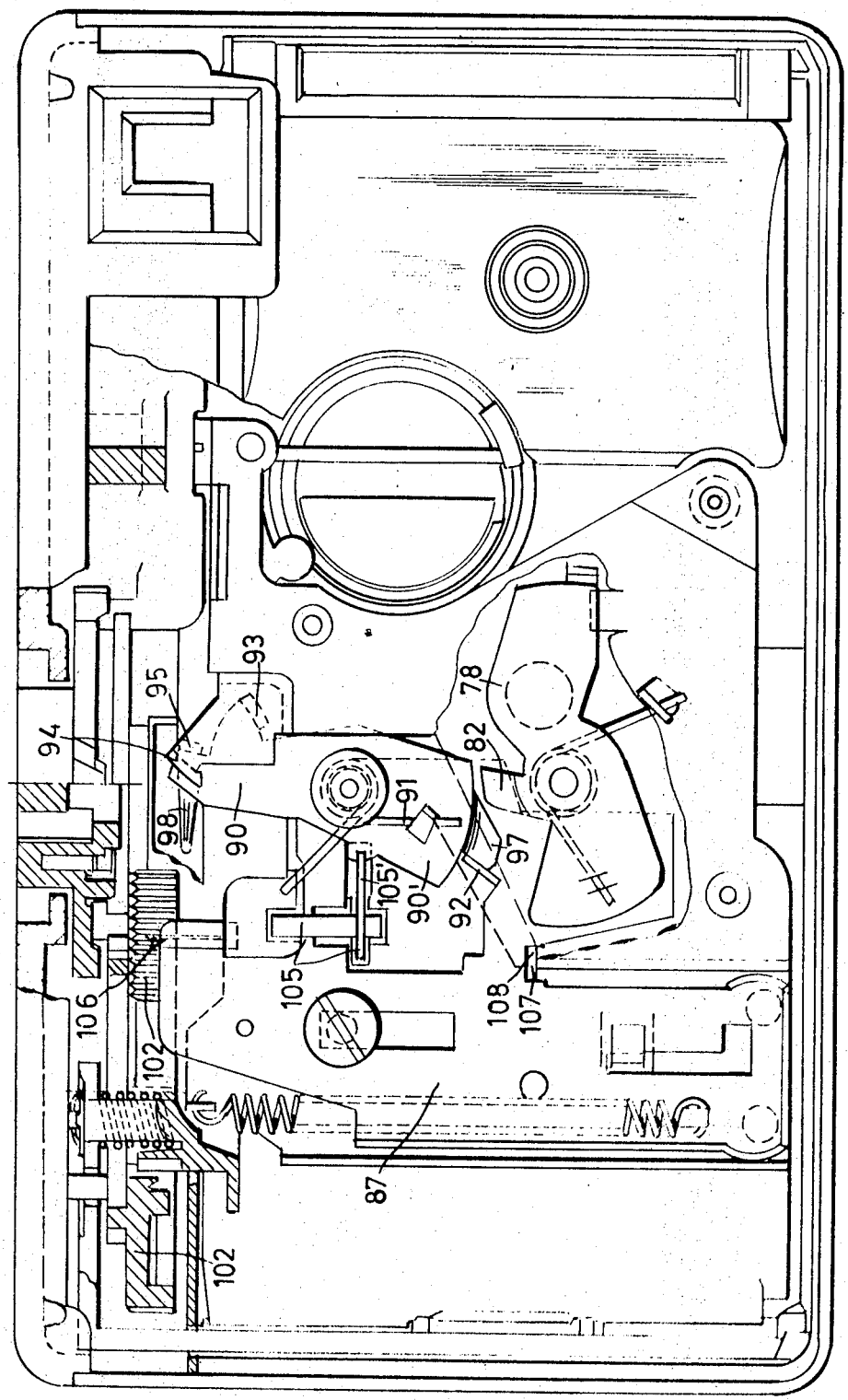
FIG. 10 a view similar to FIG. 8 with depressed trigger immediately after exposure and before releasing the exposure-release-slide-plate.

The downward movement of slider 87 at exposure release actuation is limited by the abutment of the bent-off nose 107 at an edge 108 of mounting plate 76 (FIG. 10).

It will thus be seen that the objects set forth above, among those made apparent from the preceding description, are efficiently attained and since certain changes may be made in the above constructions without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

Reference numbers in the claims shall serve only for better understanding but not restrict the invention and the scope of the claims in any direction.

I claim:

1. A photographic camera for a film on a film spool, said film having a surface and having perforations, said camera having a housing, said camera having a mutual transport and exposure locking device for said film and an automatically advanced flashcube receptacle having a plurality of protruding noses, said receptacle having flashcube contacts, and a shutter segment; said camera comprising a spring-loaded locking equipment having a first film transport locking position and a second exposure locking position, an exposure release trigger and a film transport mechanism having a film transport wheel, said mechanism cooperating mutually with said locking equipment, said trigger having first means for arresting said locking mechanism in said first film transport locking position during the operation of said trigger until said trigger has returned from the operated position thereof to the starting position thereof, said trigger having second means for moving said locking equipment to the exposure lock position thereof, a swiveling control lever disposed to engage said locking equipment for arresting the same in said exposure lock position after exposure until said flashcube has been completely advanced, a rotatable part on said flashcube receptacle, said rotatable part having a cam and a stationary abutment in said housing, said cam disposed for engaging said control lever and for moving the latter against said stationary abutment, stopping the movement of said receptacle and disengaging said control lever from said locking equipment after said flashcube has been completely advanced to enable returning of said locking equipment to said transport locking position in the case of absence of said film and setting of said returning in the case of presence of said film, and sensing means connected with said locking equipment, said sensing means controlled by both said surface and said perforations of said film, said sensing means causing upon engaging said perforation of said film said locking equipment to move from the disengaged position thereof to said film transport locking position.

2. A photographic camera according to claim 1, and a release slider constituting said exposure release trigger, said locking equipment having a film transport locking lever, said lever cooperating with said release slider, a spring-loaded lock slider on said locking equipment, said lock slider pivotally supporting said film transport locking lever, said lock slider having one end constituting said sensing means engaging said perforations of said film at the reset position of said lock slider, a first abutting face on said release slider and an oblique face on said lock slider, said abutting face of said release slider cooperating with said oblique face of said lock slider for disengaging the latter from said film and tensioning said lock slider at the same instant, spring means in said camera, said spring means forcing said transport lock lever in the reset position of said lock slider into engagement with said film transport wheel, a slide face on said release slider, said locking lever being urged against said slide face upon tensioning of said lock slider, a second abutting face on said release slider, said locking lever also urged against said second face when said locking lever is reset to the starting position thereof, and the relative positions of said slide face, of said first and of said second abutting faces and of said transport locking lever disposed in such manner as to have the latter arrested in said transport lock position against the force of said spring means when said release slider is operated whereby said film transport mechanism is disengaged by the force of said spring means, locking said release slider in the unoperated position thereof.

3. Photographic film camera according to claim 1, and a friction coupling on said transport wheel, said coupling connecting said flashcube receptacle to said transport wheel.

4. Photographic film camera according to claim 3, said friction coupling of said flashcube receptacle and said transport wheel is controlled by said swiveling lever said lever being slidable in a vertical direction and being rotatable, and having a first tongue abutting against said stationary abutment in said housing, a second tongue abutting against one of said plurality of protruding noses of said flashcube receptacle stopping the movement of the latter, and a third tongue being positioned in the area of said release slider and being urged by the latter against said spring action, and a fourth tongue entering behind said nose of said lock slider during exposure release operation.

5. Photographic film camera according to claim 2, and an arm on said film transport locking lever, said locking lever being held by said release slider during exposure release in said transport lock position despite the sliding of said lock slider, thereby lifting said arm of said transport locking lever from said stationary abutment of said housing.

6. Photographic camera according to claim 1, said camera having a cover, a slider and a spring on said cover, said coupling between said transport wheel and said film spool being controlled by said slider, said slider being guided along said cover by said spring, said spring unlocking into a sidely shifted resting position and returning to the locking position when said cover is closed.

7. Photographic film camera according to claim 1, said swiveling, control lever having means for setting said shutter segment in motion, said control lever locking simultaneously the movement of said flashcube receptacle by engaging one of said plurality of said noses of said receptacle.

8. Photographic film camera according to claim 1 said swiveling control lever having coupling means for coupling thereof with said exposure release trigger.

9. A photographic film camera according to claim 8, said swiveling control lever having a pivot and having a first tongue bent to be in the way of the motion of said noses of said flashcube receptacle when said release trigger in the unoperated position thereof, and having a second tongue bent off the plane of said swiveling control lever, a stationary slide nose disposed in said housing in such manner that said second tongue of said swiveling control lever assumes a first intermediate position in front of said stationary slide nose when said swiveling control lever is rotated by said first tongue engaging one of said plurality of said noses on said flashcube receptacle during the advancement thereof, said stationary slide nose further disposed in such manner that said second tongue of said swiveling control lever can slide along said stationary slide nose when said release trigger is operated, a third tongue on said swiveling control lever and an actuating tongue on said shutter segment, said third tongue and said actuating tongue disposed in such manner that said third tongue of said swiveling control lever engages said actuating tongue on said shutter segment when said second tongue has passed said stationary slide nose, said third tongue operating said shutter segment in a wiping action when said swiveling control lever is returned to the starting position thereof.

10. A photographic film camera according to claim 2, said swiveling control lever having a projecting member, said member having an edge and said lock slider having a slot, said projecting member disposed for engaging said slot for arresting said lock slider in the tensioned position thereof, said edge being disposed adjacent said lock slider but not touching the latter during the exposure release position thereof.

11. A photographic film camera according to claim 10, said stationary slide nose having an oblique face in the direction of motion of said pivot of said control lever, and a torsion spring on said control lever, said oblique face disposed for guiding said second tongue of said control lever when said release trigger is operated, said control lever being yieldingly rotated and tensioned against said torsion spring.

12. Photographic film camera according to claim 1, and a synchroflash contact in said camera, said first tongue on said swiveling control lever disposed for entering the location of said synchroflash contact at the start of the opening of said shutter segment.

13. Photographic film camera according to claim 12, said synchroflash contact being an integral part of one of said flashcube contacts.

14. Photographic film camera according to claim 1, and having a shutter segment therein said segment having an equilibrium maintaining mass exceeding the minimum required segment structure for the physical strength thereof.